(12) United States Patent
Khan et al.

(10) Patent No.: US 10,009,284 B2
(45) Date of Patent: Jun. 26, 2018

(54) POLICY-BASED SESSION ESTABLISHMENT AND TRANSFER IN A VIRTUALIZED/CLOUD ENVIRONMENT

(71) Applicant: Verizon Patent and Licensing Inc., Basking Ridge, NJ (US)

(72) Inventors: Naseem A. Khan, Oak Hill, VA (US); John K. Connell, Quincy, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 624 days.

(21) Appl. No.: 13/931,410

(22) Filed: Jun. 28, 2013

(65) Prior Publication Data

US 2015/0006733 A1    Jan. 1, 2015

(51) Int. Cl.
*G06F 15/173* (2006.01)
*H04L 12/911* (2013.01)
*H04L 12/927* (2013.01)

(52) U.S. Cl.
CPC ............ *H04L 47/70* (2013.01); *H04L 47/805* (2013.01); *H04L 47/808* (2013.01); *H04L 47/822* (2013.01); *H04L 47/829* (2013.01)

(58) Field of Classification Search
CPC ..... H04L 47/70; H04L 47/805; H04L 47/822; H04L 47/829; G06F 9/00
See application file for complete search history.

(56) References Cited

U.S. PATENT DOCUMENTS

| | | | | |
|---|---|---|---|---|
| 6,621,827 B1* | 9/2003 | Rezvani | .................. | H04L 29/06 370/346 |
| 8,972,551 B1* | 3/2015 | Yanacek | ............... | G06F 15/173 709/200 |
| 2006/0129694 A1* | 6/2006 | Ishida | ................. | H04L 12/2818 709/238 |
| 2009/0157870 A1* | 6/2009 | Nakadai | ................. | G06F 9/505 709/224 |
| 2012/0254427 A1* | 10/2012 | Adams | ............... | H04L 12/2823 709/225 |
| 2013/0138816 A1* | 5/2013 | Kuo | ....................... | G06F 9/5011 709/226 |
| 2014/0068075 A1* | 3/2014 | Bonilla | ............... | H04L 41/0823 709/226 |
| 2014/0068335 A1* | 3/2014 | Bromley | ................. | H04L 43/50 714/32 |
| 2014/0280895 A1* | 9/2014 | Branson | .................. | H04L 65/60 709/224 |

* cited by examiner

*Primary Examiner* — Ryan Jakovac

(57) ABSTRACT

A device may receive a request for a particular service from a user device. The device may determine a priority class associated with the service. The device may determine, based on the priority class, quality of service requirements associated with providing the service. The device may determine, based on the quality of service requirements, one or more cloud resources for providing the service to a user of the user device. The device may allocate the one or more cloud resources to provide the service to the user.

20 Claims, 9 Drawing Sheets

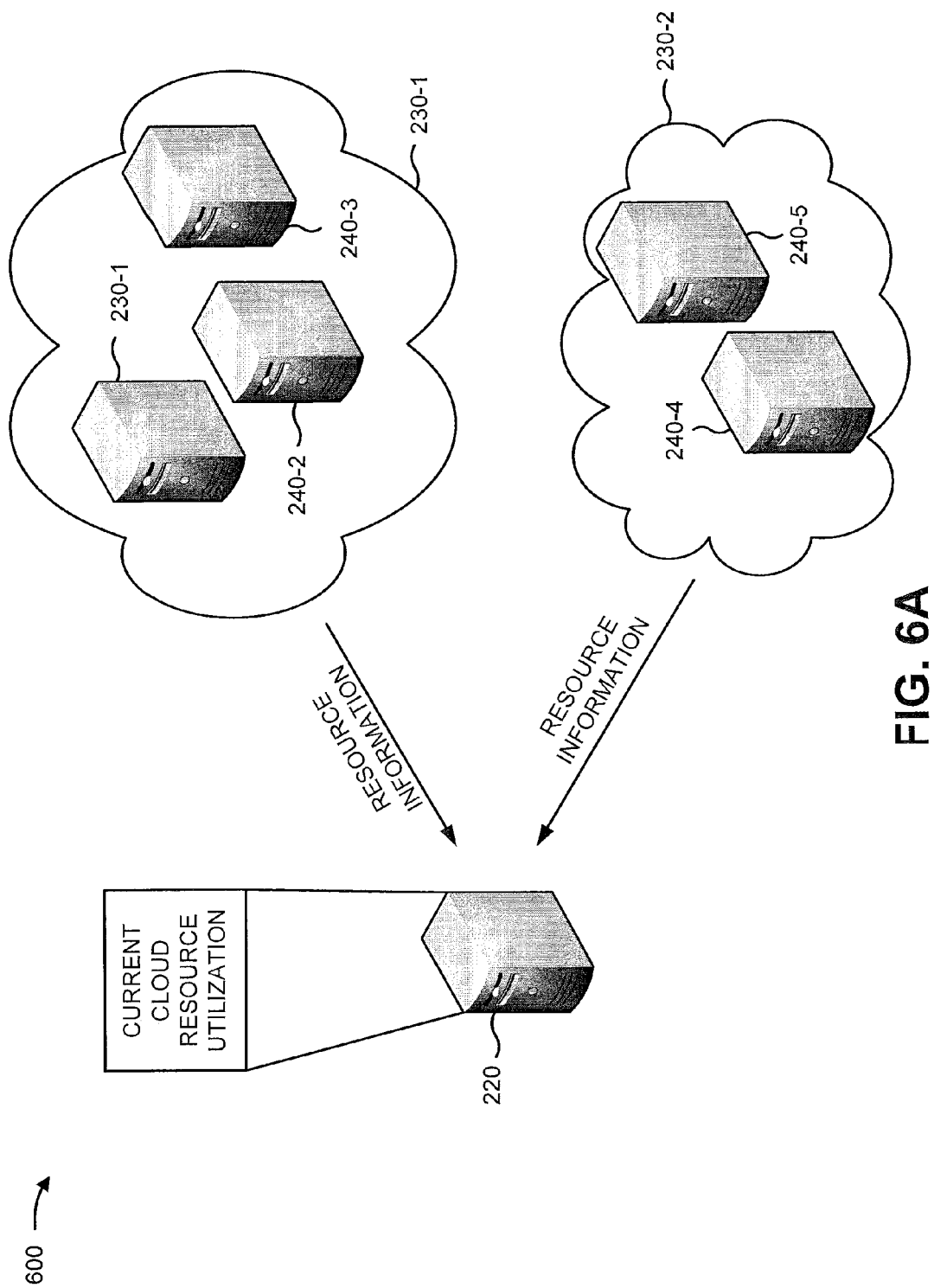

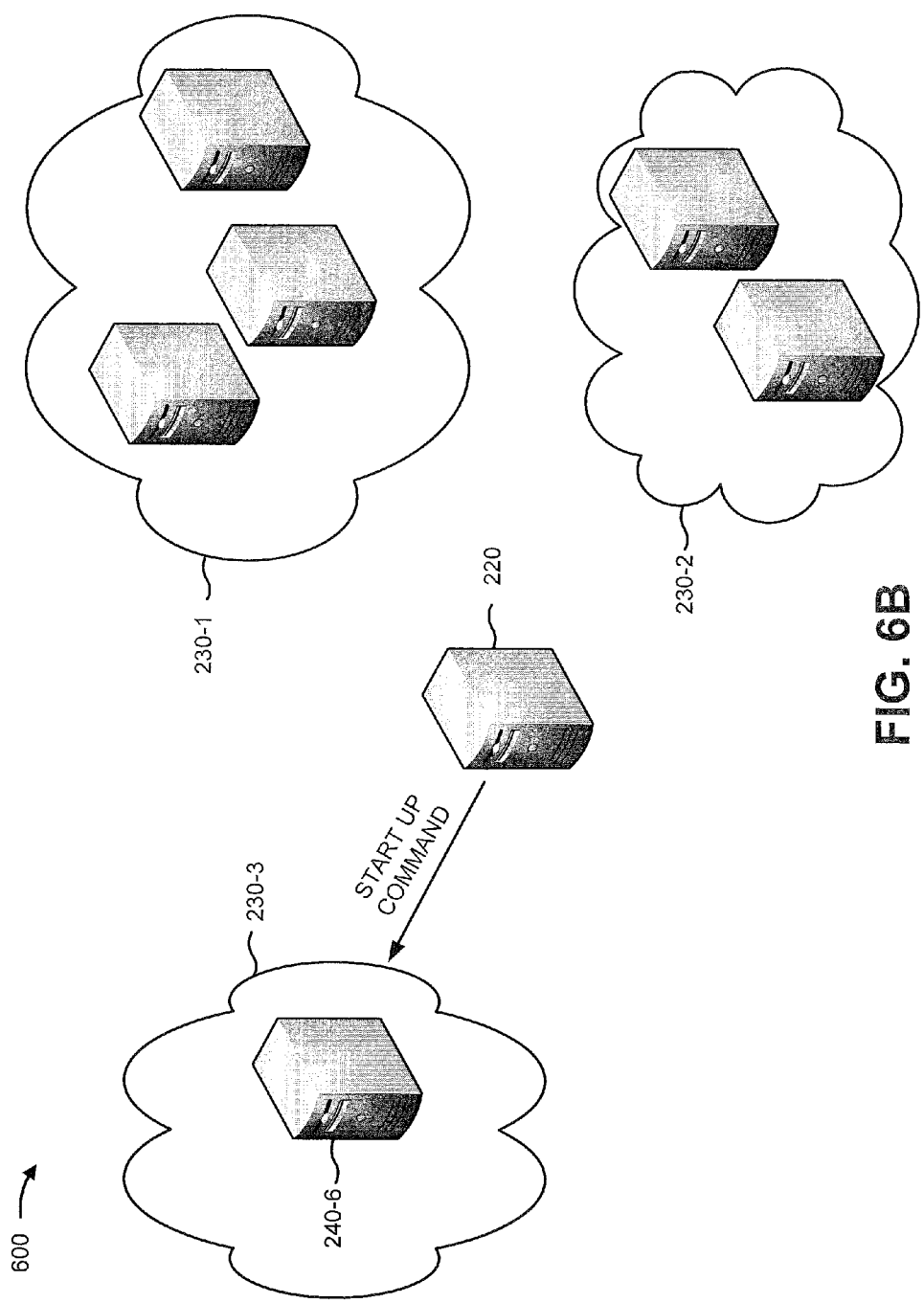

POLICY-BASED SESSION ESTABLISHMENT AND TRANSFER IN A VIRTUALIZED/CLOUD ENVIRONMENT

BACKGROUND

Cloud computing is the delivery of computing as a service rather than as a product, whereby shared resources, software, and information are provided to user devices (e.g., computers, smart phones, etc.) as a utility over a network, such as the Internet.

BRIEF DESCRIPTION OF THE DRAWINGS

FIGS. 6A and 6B are diagrams illustrating an example of the process described in connection with FIG. 5;

DETAILED DESCRIPTION OF PREFERRED EMBODIMENTS

The following detailed description refers to the accompanying drawings. The same reference numbers in different drawings may identify the same or similar elements.

When cloud resources are provided for a service, cloud and network resources may be allocated based on load balancing information and/or distributed in a statistical manner. However, allocating cloud and network resources based on load balancing information and/or distributing the cloud and network resources in a statistical manner fails to consider priorities and/or service requirements that may be associated with a user requesting a particular service and/or providing the particular service to the user.

Systems and/or methods described herein may dynamically allocate cloud and network resources using a policy-based approach that considers priorities and service requirements associated with providing a particular service to a user. By considering the priorities and service requirements, the systems and/or methods can ensure that an allocation of cloud and network resources meets quality of service requirements associated with providing the particular service to the user as well as ensuring that the network resources are optimally utilized.

Figure 1:
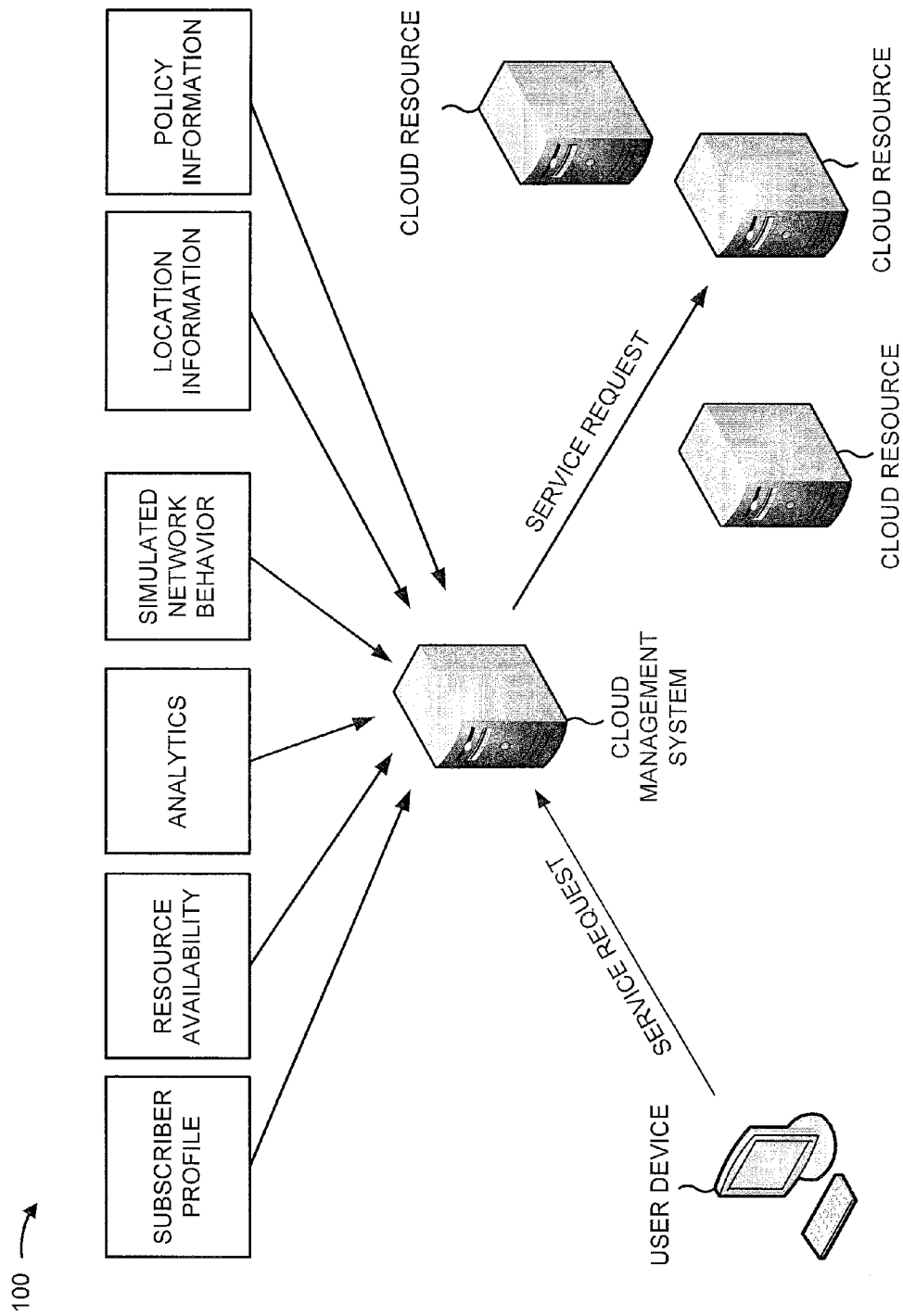
FIG. 1 is a diagram illustrating an overview of a cloud management system according to implementations described herein.

FIG. 1 provides a diagram illustrating an overview 100 of a cloud management system according to implementations described herein. For FIG. 1, assume that a user of a user device desires to access a service provided by a service provider via multiple cloud resources included in one or more cloud computing environments. As shown in FIG. 1, a cloud management system may receive, from the user device, a service request for accessing the service.

The cloud management system may obtain a subscriber profile associated with the user and/or the user device, information regarding available network resources, information regarding available cloud resources, information regarding predicted network and cloud resource utilization, information regarding simulated network behavior, as well as information regarding a location of the user and/or the user device to determine an allocation of cloud and network resources for providing the service to the user. Based on the determined allocation, the cloud management system may forward the service request to a particular cloud resource for providing the requested service to the user.

Figure 2:
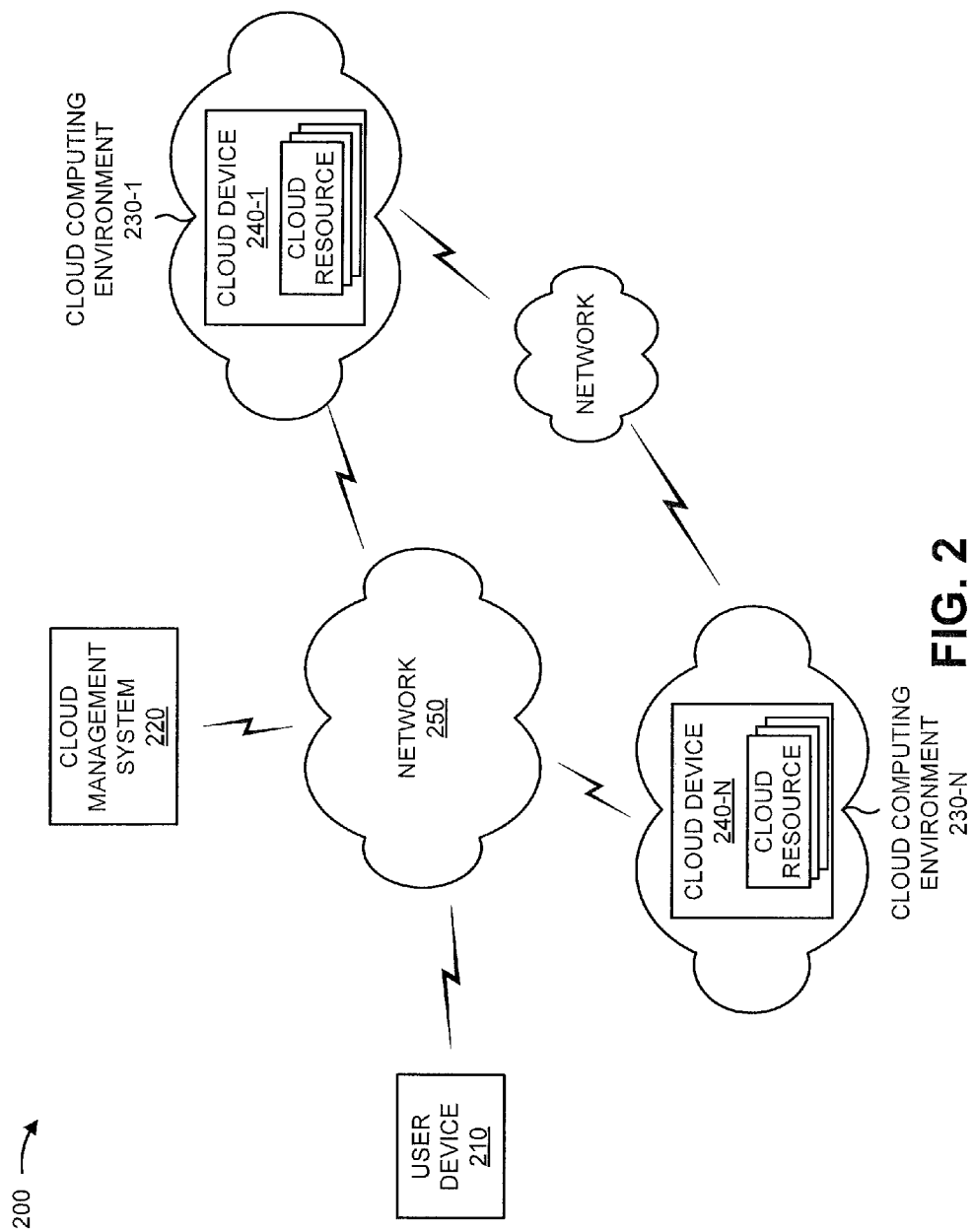
FIG. 2 is a diagram of an environment in which systems and/or methods, described herein, may be implemented.

FIG. 2 is a diagram of an environment 200 in which systems and/or methods described herein may be implemented. As shown in FIG. 2, environment 200 may include a user device 210, a cloud management system 220, and one or more cloud computing environments 230-1 through 230-N (referred to herein collectively as "cloud computing environments 230" and individually as "cloud computing environment 230") interconnected by a network 250. Devices of environment 200 may interconnect via wired connections, wireless connections, or a combination of wired and wireless connections.

User device 210 may include a device, such as a wired and/or wireless communication device, that is capable of requesting and consuming a cloud-based service. Examples of user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer (e.g., a desktop computer, a laptop computer, a tablet computer, etc.), a global positioning system (GPS) device, a set-top box, a television, a personal gaming system, and/or another similar type of device.

Cloud management system 220 may include one or more server devices that receives, processes, and provides information in a manner described herein. Cloud management system 220 may dynamically allocate cloud and network resources based on various factors, such as, for example, requirements associated with a type of service being requested, subscriber profile information, current and/or expected cloud and/or network resource availability, current and/or expected cloud and/or network resource utilization, an expected volume and/or type of service requests expected to be received during a particular period of time, simulated network behavior, a location of a requesting device (e.g., user device 210), a location of a cloud resource, and/or a type of the requesting device (e.g., desktop computer, tablet, smart phone, gaming system, set top box, etc.). Cloud management system 220 may allocate cloud and/or network resources for new service requests and/or for existing service requests being migrated from one cloud resource to another cloud resource (e.g., migration related to an occurrence of a cloud burst (e.g., a sudden spike in cloud resource utilization), power savings, routine maintenance of a cloud resource, and/or traffic pattern triggered re-allocation of cloud resources).

Cloud computing environment 230 may include an environment that includes one or more cloud devices 240 (referred to herein collectively as "cloud devices 240" and individually as "cloud device 240") for delivering computing as a service, whereby shared resources, services, user objects, etc. may be provided to user device 210 as a utility over a network. Cloud computing environment 230 may provide computation, software, data access, and/or storage services (referred to herein collectively as "cloud resources" and individually as a "cloud resource") that do not require end-user (e.g., user device 210) knowledge of a physical location and configuration of a system(s) and/or a device(s) that deliver the services.

Cloud device 240 may include one or more server devices, or other types of computation and communication devices, that gather, process, search, and/or provide information in a manner described herein. Cloud device 240 may include one or more software components, such as, for example, an operating system, a hypervisor, a virtual machine (VM), and/or an application and/or function running on the VM. In some implementations, cloud device 240 may provide cloud resources to user device 210 as a utility over a network.

The cloud resources may include a compute instance executing in cloud device 240, a storage device provided in cloud device 240, a data transfer operation executed by cloud device 240, a virtual machine executing in cloud device 240, a virtual tunnel provided between user device 210 and cloud device 240, a server (e.g., a virtual machine of cloud device 240) that is managed by cloud management system 220, etc. In some implementations, the data transfer operation may depend on compute instances, cloud storage resources, and/or servers; the virtual tunnel may depend on one or more compute instances being active; and the server may depend on virtual tunnels and/or compute instances.

In some implementations, cloud computing environments 230, cloud devices 240, and/or the cloud resources may be distributed across multiple service provider domains. Each service provider domain may include a separate cloud management system 220. A cloud management system 220 included in one service provider domain may communicate (e.g., via a network, such as, for example, a second, different network 250) with a cloud management system 220 included in a different service provider domain to perform priority-based session establishment and/or session transfer processes associated with one or more of cloud computing environments 230, cloud devices 240, and/or the cloud resources.

Network 250 may include any type of network, such as, for example, a local area network, also referred to as a "LAN," a wide area network, also referred to as a "WAN," a telephone network, such as the Public Switched Telephone Network or a cellular network, an intranet, the Internet, a combination of networks, etc. User device 210, cloud management system 220, cloud computing environments 230, and cloud devices 240 may connect to network 250 via wired and/or wireless connections. In other words, any one of user device 210, cloud management system 220, cloud computing environments 230, and cloud devices 240 may connect to network 250 via a wired connection, a wireless connection, or a combination of a wired connection and a wireless connection.

Although FIG. 2 shows example components of environment 200, in some implementations, environment 200 may include fewer components, different components, differently arranged components, or additional components than those depicted in FIG. 2. In some implementations, one or more components of environment 200 may perform one or more tasks described as being performed by one or more other components of environment 200.

Figure 3:
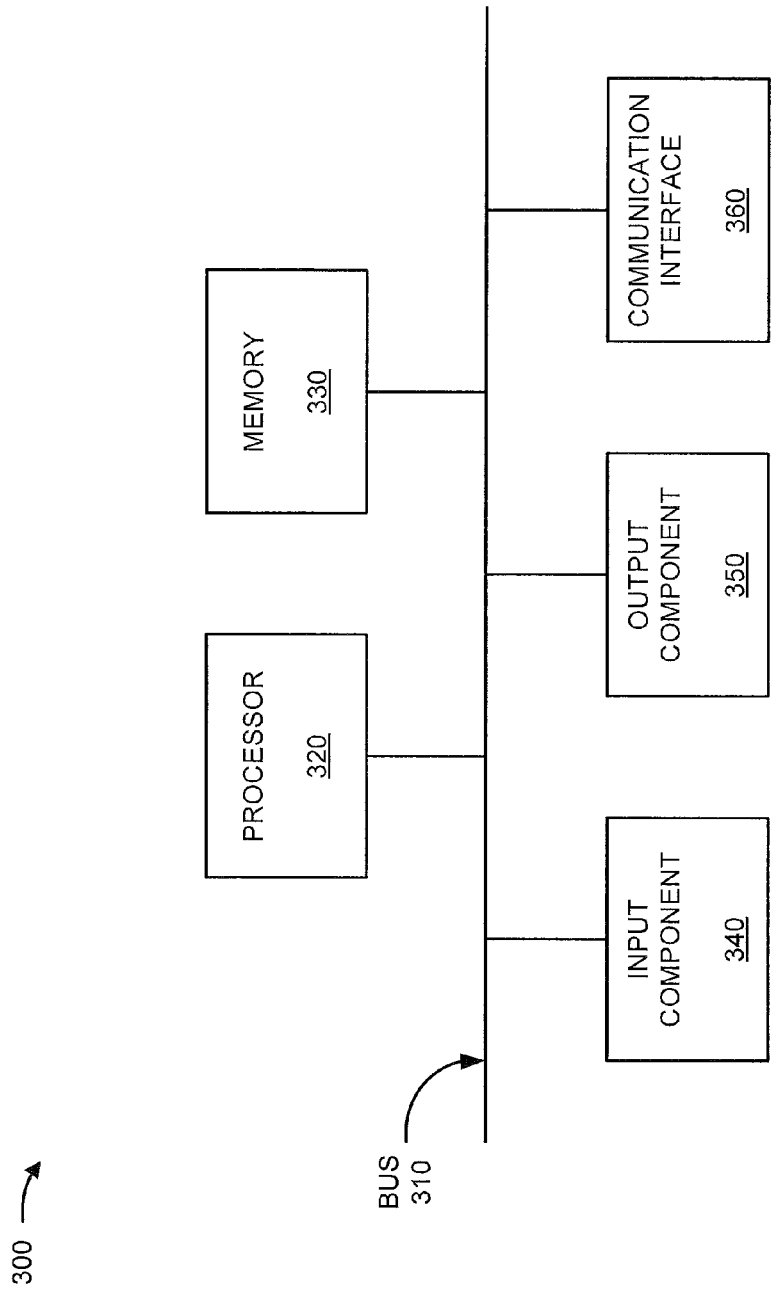
FIG. 3 illustrates example components of a device that may be used within the environment of FIG. 2 according to one or more implementations described herein.

FIG. 3 illustrates example components of a device 300 that may be used within environment 200. Device 300 may correspond to user device 210, cloud management system 220, cloud management system 220 of another service provider domain, and/or cloud device 240. In some implementations, user device 210, cloud management system 220, and/or cloud device 240 may include one or more devices 300 and/or one or more components of device 300.

As shown in FIG. 3, device 300 may include bus 310, processor 320, memory 330, input device 340, output device 350, and communication interface 360. Bus 310 may include a path that permits communication among the components of device 300. Processor 320 may include a processor, a microprocessor, an application specific integrated circuit (ASIC), a field programmable gate array (FPGA), or another type of processor that interprets and executes instructions. Memory 330 may include a random access memory (RAM) or another type of dynamic storage device that stores information or instructions for execution by processor 320, a read-only memory (ROM) or another type of static storage device that stores static information or instructions for processor 320, and/or a magnetic storage medium, such as a hard disk drive, or a removable memory, such as a flash memory.

Input device 340 may include a mechanism that permits an operator to input information to device 300, such as a control button, a keyboard, a keypad, a touch screen interface, a microphone, a camera, a video recorder, or another type of input device. Output device 350 may include a mechanism that outputs information to the operator, such as a light emitting diode (LED), a display, a speaker, or another type of output device. Communication interface 360 may include any transceiver-like mechanism that enables device 300 to communicate with other devices or networks. In one implementation, communication interface 360 may include a wireless interface, a wired interface, or a combination of a wireless interface and a wired interface.

Device 300 may perform certain operations, as described in detail below. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices.

The software instructions may be read into memory 330 from another computer-readable medium or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. In some implementations, one or more components of device 300 may perform one or more tasks described as being performed by one or more other components of device 300.

Figure 4:
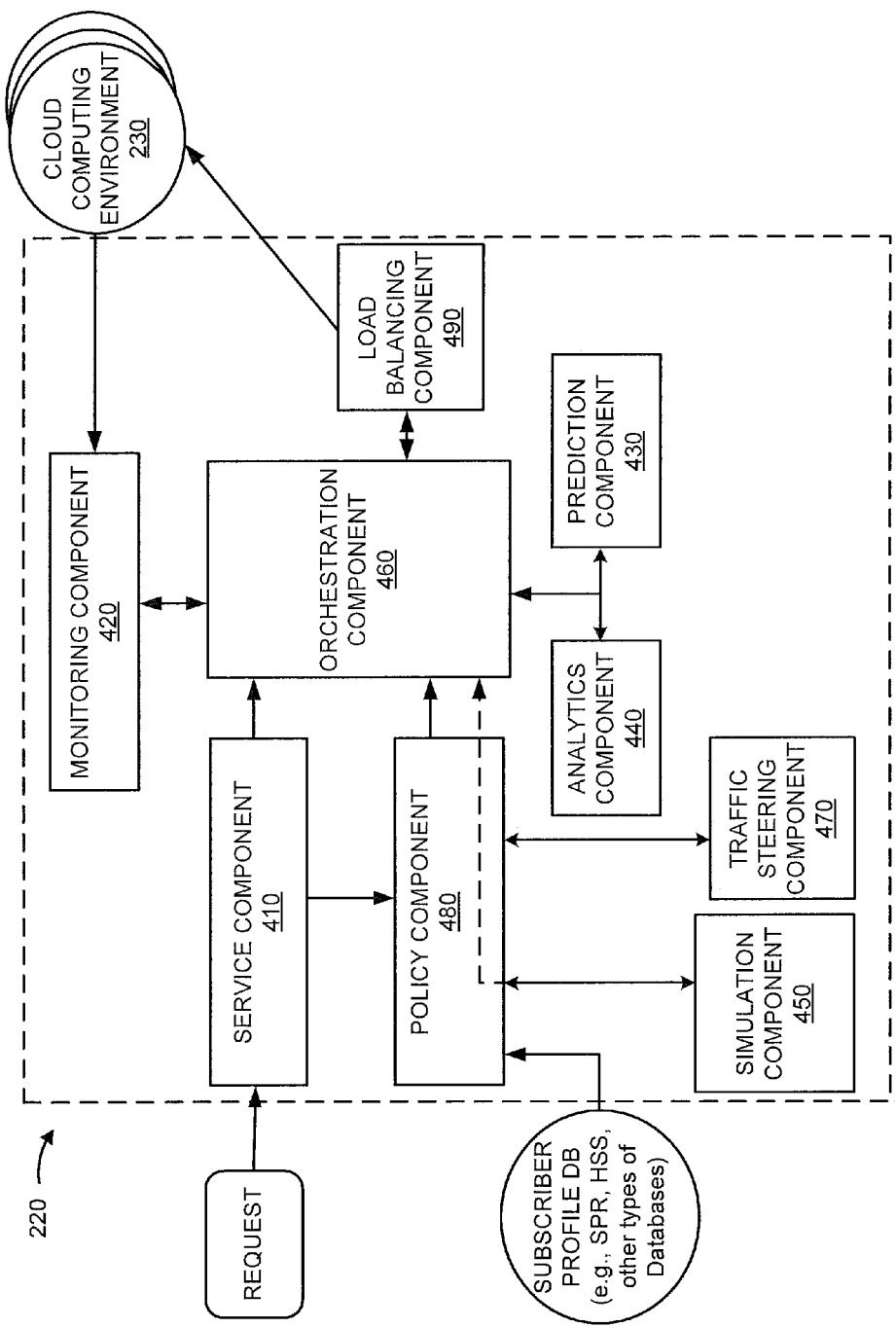
FIG. 4 is a diagram of example functional components of a cloud management system.

FIG. 4 is a diagram of example functional components of cloud management system 220. In some implementations, the functions described in connection with FIG. 4 may be performed by one or more components of device 300 or by one or more devices 300. As shown in FIG. 4, cloud management system 220 may include a service component 410, a monitoring component 420, a prediction component 430, an analytics component 440, a simulation component 450, an orchestration component 460, a traffic steering component 470, a policy component 480, and a load balancing component 490.

In some implementations, one or more of the functional components of cloud management system 220 may be selectively enabled by a user. For example, a user determine not to use information regarding expected cloud and/or network resource utilization and may disable or turn off prediction component 430. As another example, the user may determine not to use information regarding a network simulation in the process of resource allocation. The user may cause simulation component 450 to be disabled or turned off.

In some implementations, one or more functional components of cloud management system 220 may be implemented as virtualized functions (e.g., running on IT class servers). In some implementations, one or more functional components of cloud management system 220 may be integrated with one or more other functional components of cloud management system 220.

Service component 410 may perform service identification functions for cloud management system 220. For example, service component 410 may receive a request (e.g., a session request, a service request, etc.) for a service from user device 210. Service component 410 may analyze the request to identify user device 210 and/or a user of user device 210. Service component 410 may also analyze the request to identifying a service type (e.g., a video service, a voice service, an email service, a file transfer protocol service, etc.) associated with the request. In some implementations, an identifier associated with the user and/or information identifying the service type may be included in the request and service component 410 may parse the request to determine the identifier and/or the service type. Additionally, or alternatively, service component 410 may utilize a traffic detection function, a deep packet inspection (DPI) function, and/or a content filtering application to determine the service type. Service component 410 may provide information identifying the user, user device 210, and/or information identifying the service type to policy component 480.

Monitoring component 420 may perform resource monitoring functions for cloud management system 220. For example, monitoring component 420 may monitor cloud computing environment 230 and/or cloud device 240 to determine a utilization of cloud resources associated with cloud computing environment 230 and/or cloud device 240. In some implementations, monitoring component 420 may obtain information regarding network and/or cloud resource availability and/or utilization. For example, monitoring component 420 may periodically monitor cloud devices 240 to determine whether each cloud device 240 is available (e.g., operable) or unavailable (e.g., non-operable), processor utilization, and/or storage utilization for each cloud device 240. Monitoring component 420 may provide the information regarding network and/or cloud resource availability and/or utilization to orchestration component 460.

In some implementations, monitoring component 420 may communicate with other monitoring components 420 to determine a utilization of cloud resources. For example, a set of cloud resources may be located at a data center (e.g., cloud computing environment 230) that is remotely located with respect to monitoring component 420. Monitoring component 420 may communicate with a monitoring component 420 that is located at the data center to obtain information regarding a current utilization of the set of cloud resources located at the data center. In some implementations, monitoring component 420 may monitor cloud and/or network resources which are remote, such as, for example, cloud and/or network resources included in another data center.

Prediction component 430 and analytics component 440 may perform prediction and analytical functions for cloud management system 220. In some implementations, analytics component 440 may store historical information regarding requests received by cloud management system 220 and predication component 430 may determine a load that can be expected based on information obtained from analytics component 440. For example, prediction component 430 and analytics component 440 may interact to determine a resource utilization prediction. In some implementations, the resource utilization predication may identify expected volume and types of service requests of certain types expected to be received during a time of day. In some implementations, the expected utilization predication may identify an expected number of sessions for each priority class of service managed by cloud management system 220 and/or aggregate cloud resource utilization requirements for the expected sessions. The expected number of sessions for each priority class and/or the aggregate cloud resource utilization requirements may be determined periodically, for various time segments (e.g., for each day of the week, for each hour of a day, etc.), and/or in response to a command received from orchestration component 460.

In some implementations, prediction component 430 and/or analytics component 440 may determine the expected number of sessions for each priority class and/or the aggregate cloud resource utilization requirements based on historical data. For example, prediction component 430 may obtain information regarding quantities and/or types of service requests previously received by cloud management system 220 during corresponding periods of time (e.g., Tuesday mornings between 7:00 am and 9:00 am). Prediction component 430 may provide the information regarding the quantities and/or types of service requests to analytics component 440. Analytics component 440 may process the information to determine the expected number of sessions and the aggregate cloud resource utilization requirements.

In some implementations, prediction component 430 may determine origin location information associated with the expected sessions. For example, the historical data may include information identifying a geographic location of user devices 210 transmitting the previously received service requests and/or utilizing a provided service during the corresponding periods of time. Prediction component 430 may process the origin location information and may determine one or more geographic areas associated with the expected sessions. Prediction component 430 may provide the origin location information and/or information identifying the one or more geographic areas to orchestration component 460.

In some implementations, prediction component 430 may determine a period of time for reserving cloud and/or network resources. For example, prediction component 430 may include an algorithm for computing a period of time for which cloud and/or network resources are to be reserved and/or for determining a time at which cloud and/or network resources are to be released from a pool of available resources in case a volume and/or an arrival rate of service requests received by cloud management system 220 is different than a volume and/or an arrival rate predicted by predication component 430 for a particular period of time.

Once the cloud and/or network resources are released, the cloud and/or network resources may be utilized to meet other service requests.

In some implementations, the period of time for which cloud and/or network resources are to be reserved and/or the time at which the cloud and/or network resources are to be released may be a configurable parameter. For example, cloud management system 220 may receive an input from a user indicating the period of time for which cloud and/or network resources are to be reserved and/or the time at which cloud and/or network resources are to be released for a particular time period.

Simulation component 450 may perform network simulation functions for cloud management system 220. For example, simulation component 450 may receive, from policy component 480, information identifying a pool of cloud resources for providing high priority services. Simulation component 450 may simulate network behavior associated with the pool of cloud resources providing the high priority service and may determine performance data associated with the simulation. Simulation component 450 may provide the performance data to orchestration component 460 via policy component 480.

In some implementations, simulation component 450 may perform a cloud resource simulation to determine an expected behavior associated with one or more cloud resources. For example, simulation component 450 may perform one or more cloud resource simulations to determine a combination of cloud and/or network resources for providing a service and/or that will meet quality of service requirements.

Orchestration component 460 may perform orchestration functions for ensuring an availability of a pool of cloud resources for one or more services for cloud management system 220. For example, orchestration component 460 may receive information regarding an expected utilization of cloud resources from prediction component 430 and/or analytics component 440, information regarding a current utilization of cloud resources from monitoring component 420, and information regarding current loads of cloud devices 240 from load balancing component 490. Based on the information regarding the expected utilization of cloud resources, the information regarding the current utilization of cloud resources, and/or the information regarding the current loads of cloud devices 240, orchestration component 460 may determine information regarding a pool of cloud resources required for providing high priority services during a particular period of time. Orchestration component 460 may cause cloud and/or network resources to be reserved and/or allocated prior to receiving a request for the resource. Pre-reserving and/or pre-allocating the cloud and/or network resources may enable the resources to be readily available for an incoming service request and/or may reduce a latency associated with creating new resources and/or conducting an evaluation, in real time, to determine resource availability.

In some implementations, the information regarding the pool of cloud resources may identify quantities and/or types of cloud resources required for providing the high priority services and/or information identifying a preferred location of cloud devices 240 implementing the cloud resources (e.g., a quantity of virtual machines, an amount of storage, a quantity of cloud devices 240, information identifying a preferred location of one or more of the quantity of cloud devices 240, etc.). In some implementations, in response to a command received from policy component 480, orchestration component 460 may cause new instances of cloud resources to be created on one or more cloud devices 240 to ensure the available of the pool of cloud resources.

Traffic steering component 470 may perform traffic steering functions for cloud management system 220. For example, traffic steering component 470 may direct a request to a specific set of cloud resources (e.g., a set of virtual machines) implemented on a set of cloud devices 240 that are physically located at multiple, different geographic locations. In some implementations, traffic steering component 470 may direct the request to the specific set of cloud resources based on information regarding the pool of cloud resources provided by orchestration component 460. For example, the information regarding the pool of cloud resources may identify a preferred location of cloud devices 240 for providing a particular service during a particular period of time. Prior to the particular period of time, traffic steering component 470 may direct requests to cloud resources 240 located at locations other than the particular location to ensure that the cloud resources 240 at the particular location are available for providing the cloud resources for the particular service during the particular period of time.

Policy component 480 may perform policy control and enforcement functions for cloud management system 220. For example, policy component 480 may apply a policy-based approach for determining allocations of cloud resources for received requests. In some implementations, policy component 480 may determine quality of service requirements and/or performance requirements for providing a service based on a subscriber profile and service information. Policy component 480 may identify cloud resources, from the pool of available cloud resources, for providing the service. Policy component 480 may provide the request and information identifying the identified cloud resources to load balancing component 490 via orchestration component 460.

In some implementations, policy component 480 may interact with orchestration component 460 to ensure the availability of a pool of cloud resources for providing a particular service. For example, based on information regarding the pool of cloud resources received from orchestration component 460, policy component 480 may start one or more new instances of one or more cloud resources and/or may determine a location of cloud computing environment 230 and/or cloud device 240 for implementing one or more new instances of cloud resources. Policy component 480 may send an instruction to start the one or more new instances of cloud resources to orchestration component 460. The instruction may include information identifying the one or more new instances, information identifying one or more particular cloud environments 230 and/or cloud devices 240, and/or information identifying a geographic location associated with the one or more new instances of cloud resources. Orchestration component 460 may receive the instruction and may cause the one or more new instances to be started based on the instruction.

Load balancing component 490 may perform load balancing functions for cloud management system 220. For example, load balancing component 490 may receive a set of service requests and information identifying a set of allocated cloud resources from policy component 480. Load balancing component 490 may balance service request loads, associated with the set of service requests, on the set of cloud resources. In some implementations, load balancing component may obtain load information from cloud computing environments 230 and/or cloud devices 240 and may provide the load information to orchestration component 460 for maintaining the pool of available cloud resources.

Although FIG. 4 shows example functional components of cloud management system 220, in some implementations, cloud management system 220 may include fewer functional components, different functional components, differently arranged functional components, or additional functional components than depicted in FIG. 4. In some implementations, one or more functional components of cloud management system 220 may perform one or more tasks described as being performed by one or more other functional components of cloud management system 220.

Figure 5:
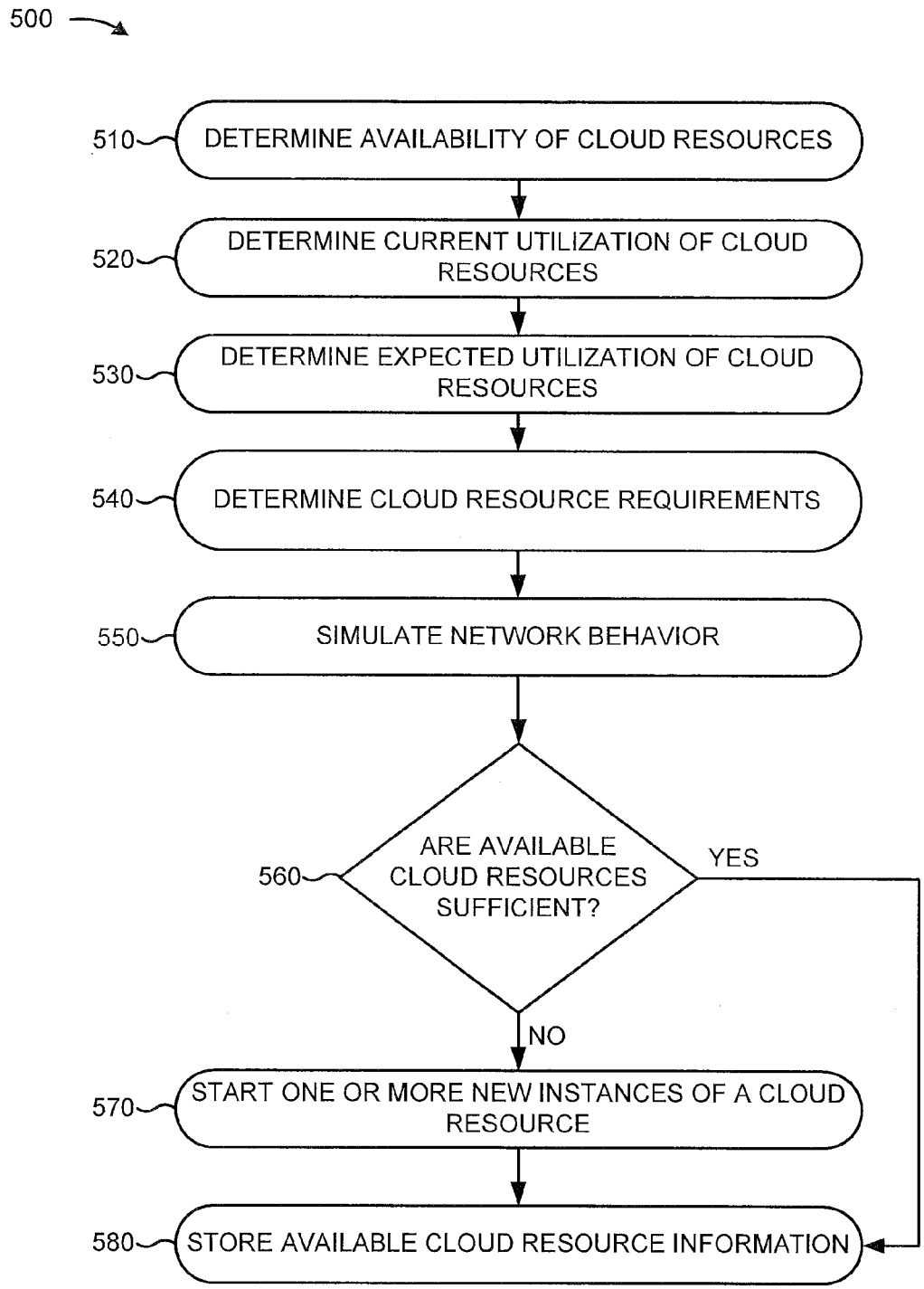
FIG. 5 is a flow chart of an example process for maintaining a pool of available cloud resources.

FIG. 5 is an example process 500 for maintaining a pool of cloud resources. In some implementations, process 500 may be performed by cloud management system 220. In some implementations, one or more blocks of process 500 may be performed by one or more devices instead of, or possibly in conjunction with, cloud management system 220.

As shown in FIG. 5, process 500 may include determining an availability of cloud resources (block 510). For example, a particular cloud device 240 and/or cloud computing environment 230 may become inoperable and/or unavailable for providing cloud resources. Cloud management system 220 (e.g., monitoring component 420) may obtain information indicating that the particular cloud device 240 and/or cloud computing environment 230 are inoperable and/or unavailable for providing cloud resources. Cloud management system 220 may determine, based on the obtained information, that cloud resources, associated with the particular cloud device 240 and/or cloud computing environment 230 are unavailable for providing a service to user device 210.

Process 500 may include determining a current utilization of cloud resources (block 520). For example, cloud management system (e.g., monitoring component 420) may obtain information regarding a current utilization of cloud resources. The information regarding the current utilization of cloud resources may include information identifying, for each cloud device 240 and/or cloud computing environment 230, CPU utilization data (e.g., information regarding available processing capability), compute utilization data (e.g., information regarding available instances, available hardware profiles, available addresses, available keys, etc.), and/or storage utilization data (e.g., information regarding an amount of available storage).

In some implementations, cloud management system 220 may periodically determine the current utilization of cloud resources. For example, cloud management system 220 may be remotely located from a particular cloud computing environment 230. Cloud management system 220 may periodically transmit a request for information regarding a current utilization of cloud resources to a monitoring component 420 associated with the particular cloud computing environment 230.

In some implementations, the period for determining the current utilization of cloud resources may be variable and/or customized by a user (e.g., a service provider associated with providing cloud resources for a service). For example, cloud management system 220 may determine the current utilization of cloud resources more frequently during periods associated with an increased demand for cloud resources (e.g., workdays, afternoons, between 8:00 am and 6:00 pm, etc.) than periods associated with a decreased demand for cloud resources (e.g., nights, early mornings, between 11:00 pm and 5:00 am, etc.).

In some implementations, cloud management system 220 (e.g., policy component 480) may store information associated with the current utilization of cloud resources in a table. For example, Table 1, below, illustrates information associated with the current utilization of cloud resources.

TABLE 1

Cloud Resource ID
Cloud Resource CPU Utilization
Cloud Resource Storage Utilization Referring to Table 1, the information may include a Cloud Resource Identifier (ID) block, a Cloud Resource Central Processing Unit (CPU) Utilization block, and a Cloud Resource Storage Utilization block. The Cloud Resource ID block may store an identifier or other information identifying a particular cloud resource. For example, the Cloud Resource ID block may store an identifier and/or other information identifying a particular cloud device 240, a particular instance of a cloud resource, etc.

The Cloud Resource CPU Utilization block may store information identifying a current utilization of a processing capability of cloud computing environment 230 and/or cloud device 240. For example, the Cloud Resource CPU Utilization block may store information identifying a current utilization of compute instances, an aggregate processing capability of cloud devices 240 currently being utilized within a particular cloud computing environment 230, and/or a percentage of processing capability of a particular cloud device 240 currently being utilized.

The Cloud Resource Storage Utilization block may store information identifying a storage capacity of cloud computing environment 230 and/or cloud device 240. For example, the Cloud Resource Storage Utilization block may store information identifying an aggregate amount of memory of cloud devices 240 included in a particular cloud computing environment 230 currently being utilized and/or an amount of available memory of a particular cloud device 240.

Process 500 may include determining an expected utilization of cloud resources (block 530). For example, cloud management system 220 (e.g., prediction component 430) may access historical data associated with providing cloud resources during a particular period of time (e.g., a time of day, a day of week, mornings, evenings, between 8:00 am and 5:00 pm, etc.). Based on the historical data, cloud management system 220 may determine an expected number of sessions, an expected number of sessions per service class, an expected duration of the expected sessions, and/or aggregate cloud resource requirements for the particular period of time. In some implementations, cloud management system 220 may divide the particular period of time into a number of time segments. During each time segment, cloud management system 220 may determine an expected utilization of cloud resources for a subsequent/following time segment.

In some implementations, cloud management system 220 (e.g., policy component 480) may store information associated with the expected utilization of cloud resources in a table. For example, Table 2, below, illustrates information associated with the expected utilization of cloud resources.

TABLE 2

Time of Day
Expected Aggregate Cloud Resource Utilization Requirement
Priority Class
Expected Number of Sessions
Available Cloud Resources
Location Preference Referring to Table 2, the information may include a Time of Day block, an Expected Aggregate Cloud Resource Utilization Requirements block, a Priority Class block, an Expected Number of Sessions block, an Available Cloud Resources block, and a Location Preference block. The Time of Day block may store information identifying a period of time associated with Table 2. For example, the Time of Day block may store information identifying a day of week, a time of day, a time segment, etc.

The Expected Aggregate Cloud Resource Utilization Requirements block may store information regarding an expected utilization of cloud resources determined by prediction component 430. For example, the Expected Aggregate Cloud Resource Utilization Requirements block may store information identifying an aggregate number of compute instances expected to be executed in cloud devices 240, an aggregate number of data transfer operations expected to be executed by cloud devices 240, an aggregate number of virtual machines expected to be executed in cloud devices 240, etc.

The Priority Class block may store information identifying one or more priority classes associated with the expected session. For example, the Priority Class block may store information identifying a high priority class of services, a low priority class of services, etc.

The Expected Number of Sessions block may store information identifying a quantity of sessions expected for each priority class identified in the Priority Class block. For example, the Expected Number of Sessions block may store a number (e.g., 10, 20, etc.), information identifying a relative quantity of sessions (e.g., high, low, great, few, many, etc.), and/or other types of information identifying a quantity of expected sessions.

The Available Cloud Resources block may store information identifying a pool of available network and/or cloud resources available for providing high priority services. For example, the Available Cloud Resources block may store information identifying one or more network resources (e.g., a server, a gateway, a router, a switch, etc.), one or more cloud computing environments 230, one or more cloud devices 240, and/or one or more cloud resources implemented on one or more cloud devices 240.

The Location Preference block may store information identifying a preferred location of cloud computing environment 230 and/or cloud devices 240 associated with providing high priority services for the expected sessions and/or for creating new instances of cloud resources. For example, the Location Preference block may store information identifying a geographic area, a particular cloud environment 230, a particular cloud device 240, and/or other types of information for identifying a particular location.

Process 500 may include determining cloud resource requirements (block 540). For example, the expected utilization of cloud resources may be associated with a particular period of time. Based on the expected utilization of cloud resources, cloud management system 220 (e.g., orchestration component 460) may determine one or more cloud computing environments 230, one or more cloud devices 240, and/or one or more cloud resources required for providing high priority services during the particular period of time.

In some implementations, cloud management system 220 may determine quality of service requirements associated with providing the high priority services. For example, cloud management system 220 may access a subscription database to determine service level agreement requirements associated with the providing the high priority services. Cloud management system 220 may determine cloud resource requirements for providing the high priority services based on the service level agreement requirements. Based on the determined cloud resource requirements, cloud management system 220 may determine one or more cloud computing environments 230, one or more cloud devices 240, and/or one or more cloud resources for providing services for the expected session.

In some implementations, cloud management system 220 may determine one or more policies and/or one or more rules associated with selecting and/or allocating cloud resources. For example, cloud management system 220 may obtain a rule and/or a policy regarding selecting and/or allocating cloud resources located in geographically diverse locations for disaster recovery purposes.

Process 500 may include simulating network behavior (block 550). For example, cloud management system 220 (e.g., simulation component 450) may generate a service graph for providing a service to user device 210. The service graph may represent an application flow (e.g., traffic) between an ordered set of devices (e.g., user device 210, network resources (e.g., cloud management system 220, server devices, routers, gateways, etc.), cloud computing environment 230, and/or cloud devices 240) corresponding to the available resources and identified for providing the service to user device 210. Cloud management system 220 may execute the service graph on the identified cloud and network resources.

In some implementations, cloud management system 220 may execute the service graph as part of meeting a service request. For example, cloud management system 220 may execute the service graph once a set of cloud resources have been identified and/or allocated for providing a requested service.

In some implementations, formation and/or modification of the service graph may be performed on a dynamic basis as available cloud and/or network resources are identified and/or as a pool of reserved cloud and/or network resources are to be used. For example, the service graph may be modified in real time if cloud and/or network resources are changed based on certain conditions, such as, for example, a failure of a device, mobility of a user from one location to another location, etc.

In some implementations, cloud management system 220 (e.g., orchestration component 460) may determine, based on simulating the network behavior, a capacity and/or performance measurements associated with available cloud and/or network resources. Cloud management system 220 may determine whether the capacity and/or performance measurements are able to meet quality of service and/or performance requirements associated with providing high priority services.

In some implementations, cloud management system 220 may consider a network as a resource. For example, cloud management system 220 (simulation component 450) may determine performance characteristics of a network associated with cloud management system 220 based on traffic currently being transmitted through the network. As an example, assume that two cloud resources are identified for providing a service. Cloud management system 220 may determine based on traffic currently being transmitted through the network that the network between the two cloud resources is congested and cloud management system 220 may select other cloud resources for providing the service.

In some implementations, cloud management system 220 (e.g., prediction component 430 may determine an expected behavior of the network based on an expected load. For example cloud management system 220 may determine an expected number of service requests expected to be received during a particular period of time. Cloud management system 220 may determine an expected behavior of the network, during the particular period of time, based on the expected number of service requests.

Process 500 may include determining whether the available cloud resources are sufficient (block 560). For example, cloud management system 220 (e.g., cloud orchestration component 460) may determine the capacity and/or performance measurements associated with the available cloud and/or network resources based on simulating the network behavior. Cloud management system 220 may determine that the available cloud resources are sufficient for meeting the cloud resource requirements when the capacity and/or performance measurements are able to meet the quality of service and/or performance requirements associated with providing the high priority services.

In some implementations, an available cloud resource, such as, for example, a virtual machine, may be included in data center that is remote from another data center that includes another available cloud resource. Cloud management system 220 may determine whether the available cloud resources are sufficient by interacting with one or more monitoring functions associated with the data center or the other data center. For example, cloud management system 220 may interact with one or more resource monitoring functions to determine network performance requirements (e.g., latency) associated with the available cloud resources. In some implementations, a remote resource monitoring function may directly interact with another remote resource monitoring function to receive information regarding network performance and/or to communicate information regarding cloud resources between remote monitoring resources.

In instances where the available cloud resources are sufficient for meeting the cloud resource requirements (block 560—YES), process 500 may proceed as described in connection with block 580). In instances where the available cloud resources are insufficient for meeting the cloud resource requirements (block 560—NO), cloud management system 220 may start one or more new instances of a cloud resource (block 570). For example, cloud management system 220 (e.g., orchestration component 460) may determine a surge in utilization of cloud resources. Cloud management system 220 may start one or more instances of a cloud resource, may request a virtual machine migration, etc. based on the surge.

In some implementations, cloud management system 220 may identify a particular cloud computing environment 230 for starting one or more instances of a cloud resource. Cloud management system 220 may send an instruction to the particular cloud computing environment 230. The instruction may include information identifying a service to be provided and/or information identifying a cloud resource (e.g., a compute instance, a virtual machine, etc.). The particular cloud computing environment 230 may cause one or more instances of the cloud resource to be provided on one or more cloud devices 240 based on the instruction.

In some implementations, cloud management system 220 may identify the particular cloud computing environment 230 based on a physical location of the particular cloud computing environment 230. For example, cloud management system 220 may determine a geographic area associated with the expected utilization of cloud resources. Cloud management system 220 may send the instruction to the particular cloud computing environment 230 based on a proximity of the physical location of the particular cloud computing environment 230 with respect to the geographic area.

In some implementations, the particular cloud computing environment 230 may be located within the geographic area. For example, based on the historical data, cloud management system 220 may determine that requests for the expected sessions are likely to originate from user devices 210 located within the geographic area. Cloud management system 220 may determine that the particular cloud computing environment 230 is located within the geographic area and may send the instruction to the particular cloud computing environment 230 to reduce latency and/or improve metrics associated with quality of service and/or service level agreement requirements.

In some implementations, cloud management system 220 may desire to physically separate cloud resources (e.g., for purposes of disaster recovery, business continuity, during a cloud resource allocation process, etc.). Cloud management system 220 may determine a physical location of cloud computing environments 230 associated with existing cloud resources. Cloud management system 220 may send the instruction to the particular cloud computing environment 230 based on the physical location of the particular cloud computing environment 230 being different than one or more physical locations of cloud computing environments 230 associated with the existing cloud resources. For example, cloud management system 220 may cause virtual machines to be created on cloud devices 240 that are located in various geographically diverse locations to improve quality of service and/or to intentionally separate the virtual machines for disaster recovery and/or business continuity purposes. In some implementations, cloud management system 220 may cause the virtual machines to be intentionally separated for disaster recovery and/or business continuity purposes based on a policy or rule included when defining a service graph.

Process 500 may include storing available cloud resource information (block 580). For example, cloud management system 220 (e.g., policy component 480) may store information identifying the available cloud resources in a memory associated with cloud management system 220 (e.g., memory 330). In some implementations, cloud management system 220 may store the information identifying the available resources in a memory of a device accessible to cloud management system 220. For example, cloud management system 220 may be physically located at a data center (e.g., cloud computing environment 230) that includes a particular cloud device 240. Cloud management system 220 may store the information identifying available cloud resources in a memory of the particular cloud device 240.

In some implementations, process 500 may be performed in conjunction with process 700 described in connection with FIG. 7. In those instances, the information identifying the available cloud resources may additionally, or alternatively, be used for allocating cloud and/or network resources for a current service request received by cloud management system 220. Additionally, or alternatively, process 500 may be performed sequentially or in partial parallel with process 700. For example, cloud computing system 220 may determine one or more portions of the information used to identify the available resources prior to a service request being received.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

FIGS. 6A and 6B are diagrams illustrating an example 600 of process 500 described in connection with FIG. 5. Referring now to FIG. 6A, cloud management system 220 may receive resource information from cloud computing environment 230-1 regarding a current utilization of cloud devices 240-1 through 240-3 and may receive resource information from cloud computing environment 230-2 identifying a current utilization of cloud devices 240-4 and 240-5. Cloud management system 220 may access historical data and may determine an expected cloud resource utilization. Based on the resource information received from cloud environments 230-1 and 230-2, cloud management system 220 may determine whether available cloud resources associated with cloud devices 240-1 through 240-5 are adequate with respect to the expected cloud resource utilization.

Referring now to FIG. 6B, assume that cloud management system 220 determines that the available cloud resources associated with cloud devices 240-1 through 240-5 are not adequate with respect to the expected cloud resource utilization. Cloud management system 220 may start one or more instances of a cloud resource to ensure that the pool of available cloud resources are adequate with respect to the expected cloud resource utilization. As shown in FIG. 6B, cloud management system 220 may send a start up command to cloud computing environment 230-3 to start one or more instances of a cloud resource on cloud device 240-6.

As indicated above, FIGS. 6A and 6B are provided merely as an example. Other examples are possible and may differ from what was described with regard to FIGS. 6A and 6B.

Figure 7:
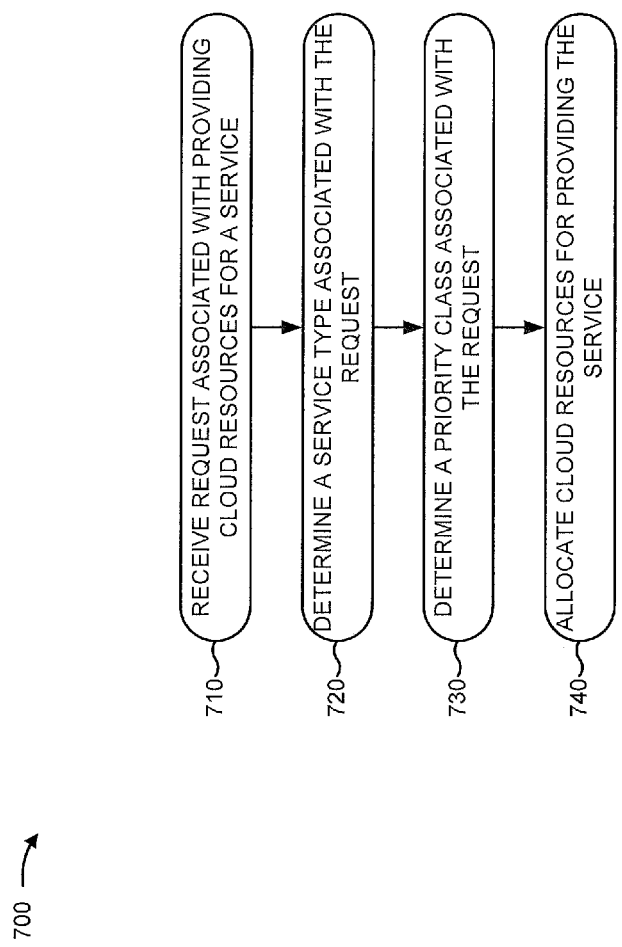
FIG. 7 is a flow chart of an example process for allocating cloud resources.

FIG. 7 is an example process 700 for allocating cloud resources. In some implementations, process 700 may be performed by cloud management system 220. In some implementations, one or more blocks of process 700 may be performed by one or more devices instead of, or possibly in conjunction with, cloud management system 220.

As shown in FIG. 7, process 700 may include receiving a request associated with providing cloud resources for a service (block 710). For example, a user of user device 210 may desire to access a service provided by cloud resources implemented on one or more cloud devices 240. User device 210 may send a request (e.g., a session request, a service request, and/or other types of requests for requesting a service) for accessing the service to cloud management system 220. Cloud management system 220 (e.g., service component 410) may receive the request from user device 210.

Process 700 may include determining a service type associated with the request (block 720). For example, the request may include information indicating a type of service (e.g., a video service, an email service, a file transfer protocol (FTP) service, etc.) associated with the request. Cloud management system 220 (e.g., service component 410) may parse the request and/or use a traffic detection function, deep packet inspection (DPI), and/or a content filtering application to determine the type of service associated with the request.

Process 700 may include determining a priority class associated with the request (block 730). For example, the request may include information identifying user device 210 and/or a user associated with user device 210. Cloud management system 220 (e.g., policy component 480) may obtain subscriber profile information and/or service information, via a subscriber database (e.g., a database maintained by a home subscriber server (HSS), a subscription profile repository (SPR), and/or other types of subscriber databases), based on the information identifying the user and/or user device 210. In some implementations, cloud management system 220 may determine the information identifying the user and/or user device 210 as described in connection with FIG. 4. Cloud management system 220 may determine the priority class associated with the request based on subscriber profile information and/or the service information.

In some implementations, the subscriber profile information may identify a subscription level associated with the user and/or user device 210. For example, the subscriber profile information may indicate that the user is associated with a premium level service, a non-premium level service, etc. Cloud management system 220 may determine the priority class based on the subscription level associated with the user.

In some implementations, cloud management system 220 may determine the priority class based on a set of predefined rules. For example, the service information may identify a set of rules for determining the priority class. Cloud management system 220 may determine that the request is for a particular type of service and may determine a priority for the particular type of service. Cloud management system 220 may determine the priority class by mapping the priority to a particular priority class based on the set of rules.

Process 700 may include allocating cloud resources for providing the service (block 740). For example, cloud management system 220 (e.g., policy component 480) may access stored information regarding available network and cloud resources. Based on the stored information and the priority class determined for the request, cloud management system 220 may identify network resources, one or more cloud computing environments 230, and/or cloud devices 240 for providing cloud resources required for providing the service. Cloud management system 220 may forward the request to the identified one or more cloud computing environments 230 and/or cloud devices 240 to allocate the cloud resources for providing the service.

In some implementations, cloud management system 220 may start one or more new instances of cloud resources based on allocating the cloud resources. For example, cloud management system 220 may determine that allocating the cloud resources results in a pool of available resources being insufficient for providing a particular service (e.g., high priority services). Cloud management system 220 may cause one or more new instances of cloud resources to be started to ensure the pool of available resources are sufficient for providing the particular service.

In some implementations, cloud management system 220 may allocate the cloud resources based on load balancing information associated with cloud computing environments 230 and/or cloud devices 240. For example, cloud management system 220 (e.g., load balancing component 490) may determine a load associated with each cloud computing environment 230 and/or cloud device 240. Cloud management system 220 may allocate the cloud resources for providing the service on a set of cloud resources based on the load associated with each cloud computing environment 230 and/or cloud device 240.

In some implementations, cloud management system 220 (e.g., traffic steering component 470) may perform a traffic steering function to allocate the cloud resources. For example, when allocating the cloud resources, cloud management system 220 may direct a session associated with the request to a specific set of cloud resources (e.g., virtual machines) implemented on a set of geographically diverse cloud devices 240.

In some implementations, cloud management system 220 (e.g., traffic steering component 470) may steer/route traffic associated with a request dynamically. As an example, assume that a media/video server is selected for meeting a service request. Once the media/video server is selected, the media/video may always be originated from the selected media/video server for that request. Cloud management system 220 (e.g., traffic steering component 470) may also re-route the traffic to another, appropriate cloud resource if there is a problem with the selected media/video server while a session for the service request is still ongoing.

In some implementations, cloud management system 220 (e.g., simulation component 450) may simulate network behavior associated with the identified network resources, one or more cloud computing environments 230, and/or one or more cloud devices 240 providing the service to user device 210. For example, cloud management system 220 may generate a service graph and may execute the service graph on the identified network resources, one or more cloud computing environments 230, and/or one or more cloud devices 240 to determine performance data (e.g., latency, jitter, etc.) associated with the identified network resources, one or more cloud computing environments 230, and/or one or more cloud devices 240 providing the service to user device 210. Cloud management system 220 may determine whether the performance data meets quality of service and/or performance requirements associated with the service.

In those instances where the quality of service and/or performance requirements are not met, cloud management system 220 (e.g., policy component 480) may modify the allocation of network and cloud resources. In some implementations, cloud management system 220 may create one or more new instances of cloud resources and may modify the allocation of network and/or cloud resources based on creating the one or more new instances of cloud resources. For example, cloud management system 220 may reduce a latency associated with providing the service to user device 210. Cloud management system 220 may determine a location of user device 210. Cloud management system 220 may identify a cloud device 240 that is located closer to the location of user device 210 than a cloud computing environment 230 and/or cloud device 240 included in the allocation of network and/or cloud resources. Cloud management system 220 may cause a new instance of a cloud resource to be created on the cloud device 240 located closer to the location of user device 210. Cloud management system 220 may modify the allocation of network and/or cloud resources to include the new instance of the computing resource.

In some implementations, cloud management system 220 (policy component 480) may store information associated with allocating the cloud resources in a table, tree, and/or another type of data structure. For example, Table 3, below, illustrates information associated with allocating the cloud resources.

TABLE 3

Session ID
Subscriber ID
Subscription Level
Service Type
User Device Type

TABLE 3-continued

Service Priority
Cloud Resource ID
Performance Requirements

Referring to Table 3, the information may include a Session ID block, a Subscriber ID block, a Subscription Level block, a Service Type block, a User Device Type block, a Service Priority block, a Cloud Resource ID block, and a Performance Requirements block. The Session ID block may store information identifying a session associated with the request. For example, the Session ID block may store an identifier, a network address associated with user device 210, cloud computing environment 230, and/or cloud device 240, and/or other types of information for identifying a particular session.

The Subscriber ID block may store information identifying user device 210 and/or a user of user device 210. For example, the Subscriber ID block may store an identifier associated with the user and/or user device 210 (e.g., a username, a network address associated with user device 210, a mobile device ID, such as, for example, SIM card information (e.g., an integrated circuit card identifier (IC-CID)), an international mobile subscriber identity (IMSI), etc.) and/or other information for identifying the user and/or user device 210.

The Subscription Level block may store information identifying a subscription level associated with providing a service to the user. For example, the Subscription Level block may store information identifying a premium service level (e.g., high priority, platinum, gold, etc.), a non-premium subscription level (e.g., low priority, silver, bronze, etc.), and/or other types of information identifying a subscription level associated with providing the service to the user.

The Service Type block may store information identifying a type of service requested by user device 210. For example, the Service Type block may store information identifying a video service, an email service, a file transfer protocol service, a data service, a voice service, and/or other types of services.

The User Device Type block may store information identifying a type of device corresponding to user device 210. For example, the User Device Type block may store information indicating that user device 210 corresponds to a desktop computer, a tablet, a smart phone, a gaming device, a set top box, and/or another type of device.

The Service Priority block may store information identifying a service priority associated with the request and/or the service. For example, the Service Priority block may store information indicating that the service is a high priority service, a low priority service, etc.

The Cloud Resource ID block may store information identifying cloud computing environment 230, cloud device 240, and/or a cloud resource associated with an ongoing session for which cloud resources have already been assigned. For example, the Cloud Resource ID block may store a network address associated with cloud computing environment 230 and/or cloud device 240, information identifying a storage location in a memory of cloud device 240, and/or other types of information for identifying cloud computing environment 230, cloud device 240, and/or the cloud resource. In some implementations, cloud management system 220 may utilize the information stored in the Cloud Resource ID block to modify an on-going session (e.g., add a party to an on-going conference call).

The Performance Requirements block may store information identifying performance requirements associated with network and/or cloud resources providing the service to user device 210. For example, the Performance Requirements block may store information regarding latency, jitter, and/or other performance data requirements associated with providing the service to user device 210.

While FIG. 7 shows process 700 as including a particular quantity and arrangement of blocks, in some implementations, process 700 may include fewer blocks, additional blocks, or a different arrangement of blocks. Additionally, or alternatively, some of the blocks may be performed in parallel.

Figure 8:
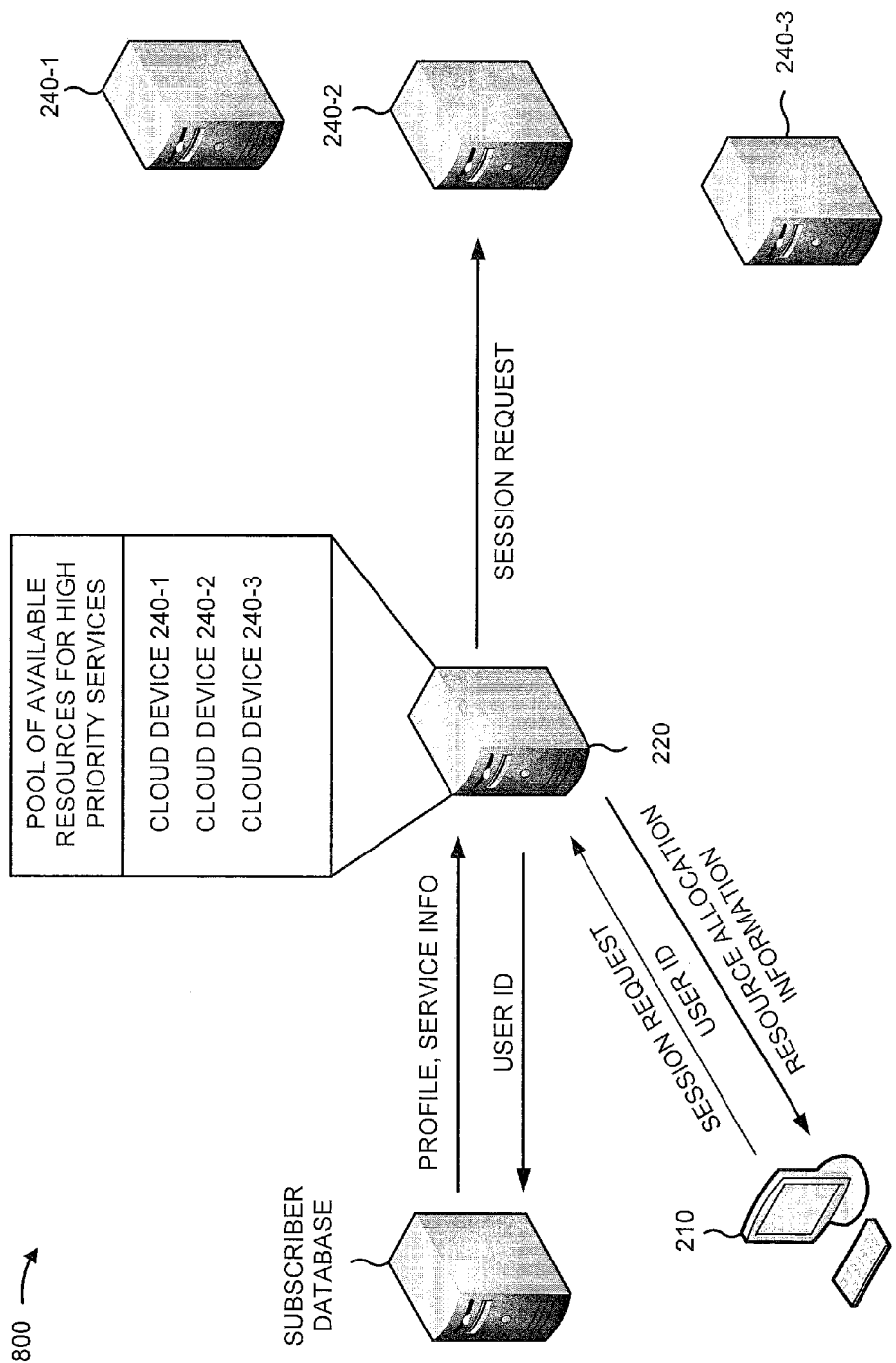
FIG. 8 is a diagram illustrating an example of the process described in connection with FIG. 7.

FIG. 8 is a diagram illustrating an example 800 of the process described in connection with FIG. 7. For example 800, assume that a user desires to participate in a video call using a video service provided by a service provider via cloud resources 240-1 through 240-3. Referring to FIG. 8, to establish the video call, user device 210 may transmit a session request and information identifying the user and/or information identifying a device type of user device 210 to cloud management system 220. Cloud management system 220 may receive the request and the information identifying the user. Cloud management system 220 may send a request for profile information and service information to a subscriber database. The request may include the information identifying the user and the subscriber database may determine a subscriber profile and service information based on the information identifying the user.

Cloud management system 220 may receive the subscriber profile and the service information from the subscriber database. Assume that cloud management system 220 determines that the session request is associated with a high priority service based on the profile information and the service information. Cloud management system 220 may access stored information identifying available cloud devices 240 for providing cloud resources for providing high priority services. Cloud management system 220 may identify one of the available cloud devices 240 and may send the session request to the identified cloud device 240 to allocate cloud resources for providing the video service to the user. As shown in FIG. 8, cloud management system 220 sends the session request to cloud device 240-2.

As indicated above, FIG. 8 is provided merely as an example. Other examples are possible and may differ from what was described with regard to FIG. 8.

The foregoing description provides illustration and description, but is not intended to be exhaustive or to limit the embodiments to the precise form disclosed. Modifications and variations are possible in light of the above teachings or may be acquired from practice of the implementations. For example, while the above description focused on determining an allocation of resources for a new service request, implementations, described herein, are equally applicable to performing an allocation of resources for existing service requests and/or on-going sessions for which resources have already been allocated by migration to new resources is required (e.g., scenarios including cloud bursting, failure conditions, power savings, routine maintenance, traffic pattern triggered resource re-allocation (including pre-emption), user of a device moving to a new location while the session is still on-going, etc.).

For example, one or more components of cloud management system 220 may be implemented in one or more data centers in a distributed manner and/or in one or more cloud environments 230. Additionally, or alternatively, the subscriber database may be included in a data center and/or in cloud computing environment 230. For example, multiple data centers and/or cloud environments 230 may include one or more subscriber databases.

As used herein, the term device is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:
1. A method comprising:
   determining, periodically and by a device, a current utilization of one or more cloud resources,
      the current utilization of the one or more cloud resources including at least one of:
         CPU utilization, or
         compute utilization, and
      the current utilization of the one or more cloud resources being determined more frequently during a first period than a second period,
         the first period being associated with a higher demand for the one or more cloud resources than the second period;
   receiving, by the device, a request for a service from a user device,
      the service to be provided, by the one or more cloud resources, during a particular period of time;
   obtaining, by the device, subscriber profile information associated with the user device based on the request,
      the subscriber profile information identifying a subscription level associated with the user device;
   determining, by the device, that the request is for a particular type of service;
   determining, by the device, a priority class associated with the request based on the subscriber profile information and based on the particular type of the service;

determining, by the device and based on historical data associated with the particular period of time, an expected utilization of cloud resources during the particular period of time,
 the expected utilization of cloud resources including:
  an expected quantity of sessions,
  an expected quantity of sessions per service class, and
  an expected duration of expected sessions, and
 the particular period of time including at least one of:
  a time of day,
  a day of a week, or
  a time period during a day;
determining, by the device and based on the priority class and the expected utilization of cloud resources, quality of service requirements associated with providing the service during the particular period of time;
determining, by the device, an allocation of the one or more cloud resources required for providing the service based on load balancing information and the expected utilization of cloud resources;
generating, by the device and based on determining the expected utilization of cloud resources, a service graph associated with an available set of cloud resources for providing the service during the particular period of time,
 the service graph representing an application flow within the available set of cloud resources for providing the service during the particular period of time;
determining, by the device, that the available set of cloud resources is insufficient for the quality of service requirements based on the service graph and based on the allocation of the one or more cloud resources required for providing the service;
determining, by the device and based on the quality of service requirements, a location from which to launch the service,
 the location being geographically closer to the user device than the one or more cloud resources;
starting, by the device, based on determining that the available set of cloud resources is insufficient, and based on the location, a new instance of cloud resources for providing the service, to the user device, during the particular period of time,
 the new instance of cloud resources being geographically closer to the user device than the one or more cloud resources; and
performing, by the device, a traffic steering function to allocate the new instance of cloud resources to provide the service, to the user device, during the particular period of time,
 the traffic steering function being implemented dynamically such that traffic is re-routed to one or more other cloud resources while a session of the service is ongoing based on a problem occurring at the new instance of cloud resources.

2. The method of claim 1, further comprising:
obtaining service information,
 the service information being associated with the user device; and
where determining the priority class includes:
 determining the priority class based on the service information.

3. The method of claim 1, further comprising:
obtaining service information,
 the service information including a set of rules for allocating the new instance of cloud resources; and
where performing the traffic steering function to allocate the new instance of cloud resources includes one or more of:
 applying a first rule, included in the set of rules, to map a priority, associated with the request, to the priority class, or
 applying a second rule, included in the set of rules, for allocating the one or more cloud resources in geographically diverse locations.

4. The method of claim 1, further comprising:
determining a load associated with the one or more cloud resources; and
where performing the traffic steering function to allocate the new instance of cloud resources includes:
 performing the traffic steering function to allocate the new instance of cloud resources based on the load associated with the one or more cloud resources.

5. The method of claim 1, further comprising:
simulating a behavior of a network associated with providing the service to the user device; and
determining performance data associated with simulating the behavior of the network; and
where performing the traffic steering function to allocate the new instance of cloud resources includes:
 performing, based on the performance data and based on the quality of service requirements, the traffic steering function to allocate the new instance of cloud resources to provide the service to the user device via the network.

6. A device comprising:
a processor to:
 determine, periodically, a current utilization of cloud resources,
  the current utilization of the cloud resources including at least one of:
   CPU utilization, or
   compute utilization, and
  the current utilization of the cloud resources being determined more frequently during a first period than a second period,
   the first period being associated with a higher demand for the cloud resources than the second period;
 receive a request for a service from a user device,
  the service to be provided, by the cloud resources, during a particular period of time;
 obtain subscriber profile information associated with the user device based on the request,
  the subscriber profile information identifying a subscription level associated with the user device;
 determine that the request is for a particular type of service;
 determine a priority class associated with the request based on the subscriber profile information and based on the particular type of the service;
 determine, based on historical data associated with the particular period of time, an expected utilization of cloud resources during the particular period of time,
  the expected utilization of cloud resources including:
   an expected quantity of sessions,
   an expected quantity of sessions per service class, and
   an expected duration of expected sessions, and the particular period of time including at least one of:
a time of day,
a day of a week, or
a time period during a day;
determine, based on the priority class and the expected utilization of cloud resources, quality of service requirements associated with providing the service during the particular period of time;
determine, based on load balancing information and the expected utilization of cloud resources, an allocation of the one or more cloud resources required for providing the service;
generate, based on determining the expected utilization of cloud resources, a service graph associated with a pool of available cloud resources for providing the service during the particular period of time,
the service graph representing an application flow within the pool of available cloud resources for providing the service during the particular period of time;
determine, based on the service graph and based on the allocation of the one or more cloud resources required for providing the service, that the pool of available cloud resources are insufficient for the quality of service requirements;
determine, based on the quality of service requirements, a location from which to launch the service,
the location being geographically closer to the user device than the one or more cloud resources;
start, based on determining that the pool of available cloud resources are insufficient and based on the location, a new instance of cloud resources for providing the service, to the user device, during the particular period of time,
the new instance of cloud resources being geographically closer to the user device than the cloud resources; and
perform a traffic steering function to allocate the new instance of cloud resources to provide the service, to the user device, during the particular period of time,
the traffic steering function being implemented dynamically such that traffic is re-routed to one or more other instances of cloud resources while a session of the service is ongoing based on a problem occurring at the new instance of cloud resources.

7. The device of claim 6, where the service includes a high priority service.

8. The device of claim 6, where, when determining the expected utilization of cloud resources, the processor is to:
determine a quantity of service requests for the service expected to be received by the device during the particular period of time.

9. The device of claim 6, where the location is a first location;
where the processor is further to:
determine performance data,
the performance data including information identifying a latency associated with the pool of available cloud resources; and
determine a second location to reduce the latency associated with the pool of available cloud resources; and
where, when starting the new instance of cloud resources, the processor is to:
start the new instance of cloud resources based on determining the second location.

10. A non-transitory computer readable medium storing instructions, the instructions comprising:
one or more instructions that, when executed by a processor, cause the processor to:
determine, periodically, a current utilization of a pool of cloud resources,
the current utilization of the pool of cloud resources including at least one of:
CPU utilization, or
compute utilization,
the current utilization of the pool of cloud resources being determined more frequently during a first period than a second period,
the first period being associated with a higher demand for the pool of cloud resources than the second period;
receive a request for a service from a user device,
the service to be provided, by the pool of cloud resources, during a particular period of time;
obtain subscriber profile information associated with the user device based on the request,
the subscriber profile information identifying a subscription level associated with the user device;
determine that the request is for a particular type of service;
determine a priority class associated with the request based on the subscriber profile information and based on the particular type of service;
determine, based on historical data associated with the particular period of time, an expected utilization of cloud resources during the particular period of time,
the expected utilization of cloud resources including:
an expected quantity of sessions,
an expected quantity of sessions per service class, and
an expected duration of expected sessions, and
the particular period of time including at least one of:
a time of day,
a day of a week, or
a time period during a day;
determine, based on the priority class and the expected utilization of cloud resources, quality of service requirements associated with providing the service during the particular period of time;
determine an allocation of cloud resources required for providing the service based on load balancing information and the expected utilization of cloud resources;
generate, based on determining the expected utilization of cloud resources, a service graph associated with an available set of cloud resources for providing the service during the particular period of time,
the service graph representing an application flow within the available set of cloud resources for providing the service during the particular period of time;
determine that the available set of cloud resources is insufficient for the quality of service requirements based on the service graph and based on the allocation of cloud resources required for providing the service;
determine, based on the quality of service requirements, a location from which to launch the service,
the location being geographically closer to the user device than the one or more cloud resources;
start, based on determining that the available set of cloud resources is insufficient, and based on the location, a new instance of cloud resources for providing the service, to the user device, during the particular period of time,
the new instance of cloud resources being geographically closer to the user device than the pool of cloud resources; and
perform a traffic steering function to allocate the new instance of cloud resources to provide the service, to the user device, during the particular period of time,
the traffic steering function being implemented dynamically such that traffic is re-routed to one or more other cloud resources while a session of the service is ongoing based on a problem occurring at the new instance of cloud resources.

11. The non-transitory computer readable medium of claim 10, where the one or more instructions, when executed by the processor, further cause the processor to:
obtain service information,
the service information being associated with the user device; and
where the one or more instructions, that cause the processor to determine the priority class, cause the processor to:
determine the priority class based on the service information.

12. The non-transitory computer readable medium of claim 10, where the one or more instructions, when executed by the processor, further cause the processor to:
obtain service information,
the service information including a set of rules for determining the priority class; and
map a priority associated with the request to the priority class based on applying the set of rules.

13. The non-transitory computer readable medium of claim 10, where one or more instructions when executed by the processor, further cause the processor to:
determine a load associated with the pool of cloud resources; and
where the one or more instructions, that cause the processor to perform the traffic steering function to allocate the new instance of cloud resources, cause the processor to:
perform the traffic steering function to allocate the new instance of cloud resources based on the load associated with the pool of cloud resources.

14. The non-transitory computer readable medium of claim 10, where the one or more instructions, when executed by the processor, further cause the processor to:
simulate a behavior of a network associated with providing the service to the user device; and
determine performance data associated with simulating the behavior of the network; and
where the one or more instructions, that cause the processor to perform the traffic steering function to allocate the new instance of cloud resources, cause the processor to:
perform, based on the performance data and based on the quality of service requirements, the traffic steering function to allocate the new instance of cloud resources.

15. The method of claim 1, further comprising:
obtaining service information,
the service information being associated with the user device; and
where determining the priority class includes:
determining the priority class based on the service information.

16. The device of claim 6, where the processor is further to:
divide the particular period of time into time segments; and
where, when determining the expected utilization of cloud resources during the particular period of time, the processor is to:
determine the expected utilization of cloud resources for a subsequent time segment.

17. The device of claim 6, where, when generating the service graph, the processor is to:
generate the service graph dynamically based on available cloud resources being identified.

18. The non-transitory computer readable medium of claim 10, where the one or more other cloud resources are virtual machines.

19. The method of claim 1, where the expected utilization of cloud resources includes:
aggregate cloud resource requirements for the particular period of time.

20. The non-transitory computer readable medium of claim 10, where the service graph is modified in real time.

* * * * *